(12) United States Patent
Savich

(10) Patent No.: US 7,607,259 B2
(45) Date of Patent: Oct. 27, 2009

(54) SUPERABSORBENT POLYMER ROOT DIP

(75) Inventor: Milan H. Savich, Beaverton, OR (US)

(73) Assignee: Absorbent Technologies, Inc., Beaverton, OR (US)

( * ) Notice: Subject to any disclaimer, the term of this patent is extended or adjusted under 35 U.S.C. 154(b) by 629 days.

(21) Appl. No.: 11/333,130

(22) Filed: Jan. 17, 2006

(65) Prior Publication Data

US 2007/0163173 A1  Jul. 19, 2007

(51) Int. Cl.
*A01C 1/00* (2006.01)
(52) U.S. Cl. .................................. 47/58.1 R
(58) Field of Classification Search ............. 47/58.1 R; 71/6
See application file for complete search history.

(56) References Cited

U.S. PATENT DOCUMENTS

| | | | |
|---|---|---|---|
| 4,058,067 A * | 11/1977 | Wright et al. ............... 111/100 |
| 4,076,663 A | 2/1978 | Masuda et al. ............. 260/17.4 |
| 4,093,542 A | 6/1978 | Dahmen et al. ............... 210/54 |
| 4,113,685 A | 9/1978 | Hubner et al. ............. 260/29.4 |
| 4,134,863 A | 1/1979 | Fanta et al. ................ 260/17.4 |
| 4,323,487 A | 4/1982 | Jones et al. .............. 525/54.32 |
| 4,367,297 A | 1/1983 | Hubner et al. ............. 523/130 |
| 4,408,073 A | 10/1983 | Goossens et al. ............ 564/204 |
| 4,528,350 A | 7/1985 | Goossens et al. ............ 526/307 |
| 4,550,527 A | 11/1985 | Hall et al. ................. 47/58.1 R |
| 4,711,919 A | 12/1987 | Peppmoller et al. ........... 524/77 |
| 4,766,173 A | 8/1988 | Bailey et al. ................ 524/819 |
| 4,773,967 A | 9/1988 | Peppmoller et al. ...... 162/168.2 |
| 4,975,105 A * | 12/1990 | Kremer et al. .................... 71/6 |
| 4,983,390 A | 1/1991 | Levy .......................... 424/404 |
| 5,118,719 A | 6/1992 | Lind ............................ 521/92 |
| 5,122,544 A | 6/1992 | Bailey et al. ............... 521/40.5 |
| 5,143,536 A * | 9/1992 | Runkis ....................... 504/284 |
| 5,147,343 A | 9/1992 | Kellenberger ............... 604/368 |
| 5,154,713 A | 10/1992 | Lind .......................... 604/358 |
| 5,176,797 A | 1/1993 | Hartan et al. ............ 162/168.3 |
| 5,292,404 A | 3/1994 | Hartan et al. ............ 162/164.6 |
| 5,344,471 A * | 9/1994 | Tuse et al. ................ 47/58.1 R |
| 5,350,799 A | 9/1994 | Woodrum et al. .......... 525/54.3 |
| 5,512,646 A | 4/1996 | Hartan et al. .......... 526/292.95 |
| 5,567,478 A | 10/1996 | Houben et al. .............. 427/342 |
| 5,856,370 A | 1/1999 | Chmelir ...................... 521/128 |
| 6,048,467 A | 4/2000 | Dahmen et al. ............ 252/8.57 |
| 6,221,832 B1 | 4/2001 | Casteel et al. ............... 510/446 |
| 6,228,964 B1 | 5/2001 | Hartan et al. ............... 526/307 |
| 6,232,285 B1 | 5/2001 | Casteel et al. ............... 510/446 |
| 6,303,560 B1 | 10/2001 | Hartan et al. ............... 510/446 |

(Continued)

OTHER PUBLICATIONS

"Starch-Encapsulated Pesticides: ARS Papers Presented at the International Seminar on Research and Development of Controlled-Release Formulations of Pesticides". Vienna, Austria Sep. 6-10, 1993 United States Department of Agriculture; Agricultural Service; 1995-1; Nov. 1994.

(Continued)

*Primary Examiner*—Francis T Palo
(74) *Attorney, Agent, or Firm*—Stoel Rives LLP

(57) ABSTRACT

A superabsorbent polymer ("SAP") root dip composition and methods of delivering a SAP to a plant are disclosed. A root structure of a plant may be dipped into a SAP hydrogel. The plant may then be planted, stored or transported for subsequent planting.

18 Claims, 1 Drawing Sheet

U.S. PATENT DOCUMENTS

| | | | | |
|---|---|---|---|---|
| 6,660,819 | B2 | 12/2003 | Chmelir et al. | 526/217 |
| 6,800,712 | B2 | 10/2004 | Doane et al. | 527/312 |
| 7,009,020 | B2 | 3/2006 | Doane et al. | |
| 7,423,106 | B2 | 9/2008 | Doane et al. | |
| 7,425,595 | B2 | 9/2008 | Savich et al. | |
| 2004/0152833 | A1 | 8/2004 | Doane | |
| 2005/0159315 | A1 | 7/2005 | Doane et al. | 504/360 |
| 2006/0047068 | A1 | 3/2006 | Doane et al. | |
| 2007/0163172 | A1 | 7/2007 | Savich | |
| 2007/0163173 | A1* | 7/2007 | Savich | 47/58.1 R |
| 2007/0167327 | A1 | 7/2007 | Savich et al. | |
| 2007/0167330 | A1 | 7/2007 | Savich | |
| 2008/0051494 | A1 | 2/2008 | Savich et al. | |
| 2009/0019905 | A1 | 1/2009 | Savich et al. | |
| 2009/0069185 | A1 | 3/2009 | Doane et al. | |

OTHER PUBLICATIONS

Office Action mailed on Mar. 19, 2007 in regards to U.S. Appl. No. 11/013,664.
Office Action mailed on Aug. 8, 2007 in regards to U.S. Appl. No. 11/013,664.
Office Action mailed on Mar. 19, 2007 in regard to U.S. Appl. No. 11/500,698.
Office Action mailed on Aug. 2, 2007 in regard to U.S. Appl. No. 11/500,698.
Office Action mailed on Jan. 16, 2007 in regard to U.S. Appl. No. 11/269,214.
Office Action mailed on Sep. 17, 2007 in regard to U.S. Appl. No. 11/269,214.
PCT Search Report mailed on Sep. 26, 2007.
Finkenstadt et al., "Reactive Extrusion of Starch-Polyacrylanide Graft Copolymers: Effects of Monomers/Starch Ration and Moisture Content". Macromolecular chemistry and Physics, vol. 206, Issue 16, Published Aug. 19, 2005. pp. 1648-1652.
Athawale et al., "Recent Trends in Hydrogels Based on Starch-Graft-Acrylic Acid: a Review". Starch/Stark, vol. 53, 2001, pp. 7-13.
Athawale et al., "Factors Influencing Absorbent Properties of Saponified Starch-G-(Acrylic Acid-Co-Acrylamide)". Journal of Applied Polymer Science, vol. 77, Issue 11, 2000, pp. 2480-2485.
Zhang et al., "Perspective on: Strategies to Fabricate Starch-Based Hydrogels With Potential Boimedical Applications." Journal of bioactive and Compatible Polymers, vol. 20, No. 3, May 2005, pp. 297-314.
Willett et al., "Preparation of Starch-Graft-Polyacrylamide Copolymers by Reactive Extrusion". Polymer Engineering and Science, vol. 43, No. 10, Oct. 2003, pp. 1666-1674.
"Instructions for gel2root Progapation System and 6 Pot Pack Refill", http://www.gel2root.com/index.cfm?fuseaction=root.pages &pageid=26 (Visited Nov. 23, 2005).
"You've Just Found the Simplest and Most Effective Way to Rransform Your Plant Cuttings Into Healthy, Vibrant New Plants!" http://wwww.gel2root.com (Visited Nov. 23, 2005).
"Why gel2root Works". http://www.gel2root.com/index. cfm?fuseaction+root.pages&pageid=21 (Visited Nov. 23, 2005).

* cited by examiner

SUPERABSORBENT POLYMER ROOT DIP

TECHNICAL FIELD

The present disclosure relates to superabsorbent polymer products and to methods and compositions for applying superabsorbent polymer products in horticultural and agricultural applications.

BRIEF DESCRIPTION OF THE DRAWINGS

The embodiments disclosed will become more fully apparent from the following description and appended claims, taken in conjunction with the accompanying drawings. Understanding that these drawings depict only typical embodiments and are, therefore, not to be considered limiting of the scope of the appended claims, the embodiments will be described with additional specificity and detail through use of the accompanying drawings in which:

DETAILED DESCRIPTION

Figure 1:
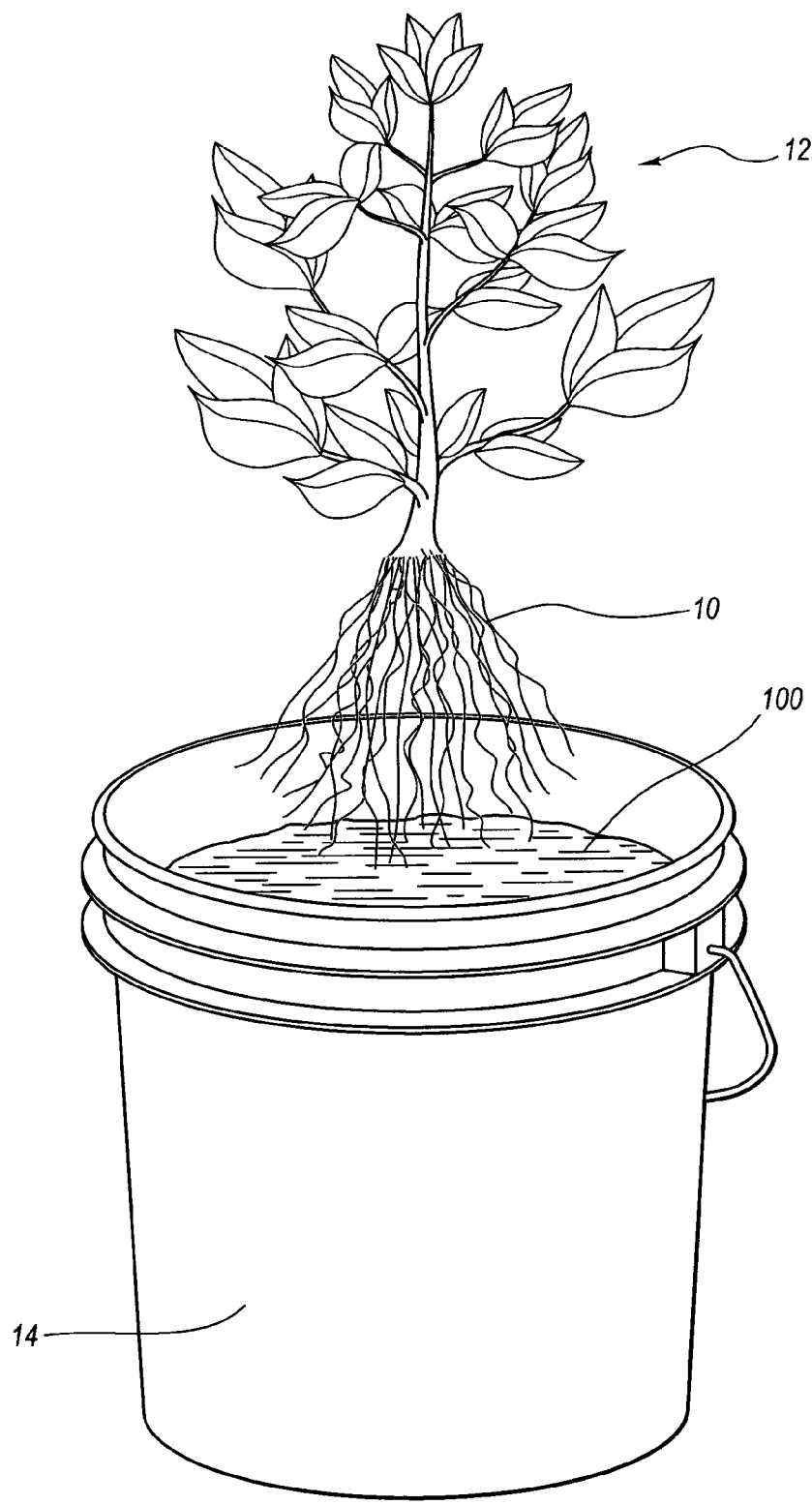
FIG. 1 is a perspective view of a root system of a plant before being dipped into a superabsorbent polymer hydrogel.

Those skilled in the art will recognize that the methods, components and compositions disclosed herein may be arranged and practiced in a wide variety of different configurations, such as without one or more of the specific details described, or with other methods, components, materials, etc. In some cases, well-known materials, components or method steps are not shown or described in detail. Furthermore, the described components, method steps, compositions, etc., may be combined in any suitable manner in one or more embodiments.

The order of the steps or actions of the methods described in connection with the embodiments disclosed may be changed as would be apparent to those skilled in the art with the aid of the present disclosure. For example, in some embodiments the method steps and/or actions may be interchanged with one another. Therefore, any order in the detailed description is for illustrative purposes only and is not meant to imply a required order.

Thus, the following more detailed description of various embodiments, as represented in the Figures, is not intended to limit the scope of the present disclosure, but is merely representative of certain exemplary embodiments. While the various aspects of the embodiments are presented in drawings, the drawings are not necessarily drawn to scale unless specifically indicated.

Superabsorbent polymers ("SAPs") are materials that imbibe or absorb at least 10 times their own weight in aqueous fluid and that retain the imbibed or absorbed aqueous fluid under moderate pressure. The imbibed or absorbed aqueous fluid is taken into the molecular structure of the SAP rather then being contained in pores from which the fluid could be eliminated by squeezing. Some SAPs can absorb up to, or more than, 1,000 times their weight in aqueous fluid.

SAPs may be used in agricultural or horticultural applications. The terms "agricultural" and "horticultural" are used synonymously and interchangeably throughout the present disclosure. Applying SAPs to soil or other plant-growing media in agricultural settings have resulted in earlier seed germination and/or blooming, decreased irrigation requirements, increased propagation, increased crop growth and production, decreased soil crusting, increased root development, stronger/heartier plants, plants less susceptible to disease, increased yield and decreased time of emergence.

Synthetic SAPs are commercially available and are conventionally used in conjunction with baby or adult diapers, catamenials, hospital bed pads, cable coating and the like. However synthetic SAPs may also be used in agricultural applications. Another type of SAP product that may be used in agricultural applications include starch graft copolymers. Starch graft copolymers comprise a monomer graft polymerized onto a polysaccharide, such as a starch or cellulose. Starch graft copolymers may be used to absorb aqueous fluids for use in absorbent softgoods, in increasing the water holding capacity of soils, and as coatings onto seeds, fibers, clays, and the like.

One method of producing a starch graft copolymer SAP for use in agricultural applications involves graft polymerizing acrylonitrile onto a starch in the presence of an initiator, such as a ceric (+4) salt, to form the starch graft copolymer, and saponifying the nitrile groups with an alkali metal to form a saponificate having alkali carboxylate and carboxamide groups.

Another method comprises (1) graft polymerizing a monomer, other than acrylonitrile, onto a starch in the presence of an initiator to form a starch graft copolymer; (2) cross-linking the starch graft copolymer, for example, by adding a cross-linking agent to cross-link the starch graft copolymer; (3) adjusting the pH of the cross-linked starch graft copolymer, e.g., neutralization; (4) isolating the cross-linked starch graft copolymer; and (5) drying the cross-linked starch graft copolymer.

Exemplary polysaccharides include cellulose, starches, flours, and meals. Exemplary starches include native starches (e.g., corn starch (Pure Food Powder, manufactured by A. E. Staley), waxy maize starch (Waxy 7350, manufactured by A. E. Staley), wheat starch (Midsol 50, manufactured by Midwest Grain Products), potato starch (Avebe, manufactured by A. E. Staley)), dextrin starches (e.g., Stadex 9, manufactured by A. E. Staley), dextran starches (e.g., Grade 2P, manufactured by Pharmachem Corp.), corn meal, peeled yucca root, unpeeled yucca root, oat flour, banana flour, and tapioca flour. The starch may be gelatinized to provide optimal absorbency. An exemplary starch is gelatinized cornstarch. Furthermore, according to one embodiment, the weight ratio of the starch to the monomer is in the range of between about 1:1 and about 1:6.

Exemplary initiators for graft polymerizing a monomer onto a starch include cerium (+4) salts, such as ceric ammonium nitrate; ammonium persulfate; sodium persulfate; potassium persulfate; ferrous peroxide; ferrous ammonium sulfate-hydrogen peroxide; L-ascorbic acid; and potassium permanganate-ascorbic acid. Other suitable initiators known to those skilled in the art may be used, such as alternative persulfates and peroxides, as well as vanadium, manganese, etc. The amount of initiator used may vary based on the chosen initiator, the selected monomer, and the chosen starch. Some initiators, e.g., persulfates, may require the presence of heat. The initiator may be added in a single or multiple steps, and multiple initiators may be used.

Exemplary cross-linking agents include: glycerides; diepoxides; diglycidyls; cyclohexadiamide; methylene bis-acrylamide; bis-hydroxyalkylamides, such as bis-hydroxypropyl adipamide; formaldehydes, such as urea-formaldehyde and melamine-formaldehyde resins; isocyanates including di- or tri-isocyanates; epoxy resins, typically in the presence of a base catalyst; and derivatives and mixtures thereof According to the first exemplary method where acrylonitrile is graft polymerized onto a starch, the resulting starch graft copolymer may be saponified with an alkali metal, such as potassium hydroxide or sodium hydroxide, to convert the nitrile groups into a mixture of carboxamides and alkali carboxylates. The starch graft copolymer may then be precipitated.

In one embodiment, precipitation occurs via an acid titration. Acid, such as hydrochloric acid, nitric acid, sulfuric acid, or phosphoric acid may be added until a pH of between about 2.0 and about 3.5, more particularly about 3.0, is reached. The resulting precipitate may be washed with water to remove the salts, and if necessary, separated in some manner. Separating methods include settling, centrifuging, and other mechanical means of separating.

The carboxylic acid of the starch graft copolymer may then be titrated back to the alkali form with the hydroxide of an alkali metal, such as potassium hydroxide, to a pH of between about 6.0 and about 8.0, more particularly about 7.0. This viscous mass may then be forced through a die plate, dusted to remove tackiness, and air or oven dried. The dried particles are then screened to the appropriate size. If desired, the particles could be ground to fine particles then formed into pellets of the desired size for use in agriculture.

In another embodiment, the isolated product is recovered from the viscous saponificate with the use of water miscible solvents such as alcohols. These include, for example, methanol, ethanol, propanol and isopropanol. The resulting dough is immersed into the alcohol, and the alkali starch graft copolymer is precipitated into particles that are optionally screened after drying to the desired size.

Formation of the starch-containing graft copolymers into particles of the desired size for direct use in agricultural equipment may be achieved by converting the viscous mass of alkali starch-graft copolymers into, for example, rod-shaped forms and drying the forms to the desired particle size. Selecting an appropriate die can vary the rod-shaped forms. A plate may be used that has been drilled or formed to contain holes of a particular size and shape. For example, the diameter of the rods may be controlled by the diameter of the holes drilled in the end plate. In one embodiment, the holes in the end plate may range from between about $1/16$ inch to about $1/4$ inch in diameter. Rod-shaped forms may be lightly coated, after the die, to reduce their tackiness. Clays, starches, flours and cellulose may be used to dust the rods. In another embodiment, the starch graft copolymer may be isolated through the use of an extruder, such as through a heated screw.

According to another method of producing a SAP product, alternative monomers other than acrylonitrile are graft polymerized onto a starch in the presence of an initiator to form a starch graft copolymer. Exemplary alternative monomers include acrylic acid or methacrylic acid. Exemplary monomers may also include acrylamide or methacrylamide. Sulfonic acids, such as 2-acrylamido-2-methyl-propanesulfonic acid (AMPS) and vinyl sulfonic acid may also be used. Moreover, acrylates, such as ethyl acrylate and potassium acrylate may also be used. Derivatives and mixtures of the above-listed monomers may also be desirable.

In applications using acrylic acid, the addition of acrylamide thereto helps induce graft polymerization and adds to absorbency of the SAP. By way of example, the ratio by weight of acrylic acid to acrylamide may be about 2:1. Alternatively, the ratio of acrylic acid to acrylamide may also range up to a ratio of 9:1 and beyond. Because acrylamide is considered a neurotoxin, it may be desirable to reduce the relative amount of acrylamide to acrylic acid, while using enough to help induce graft polymerization of acrylic acid.

In alternative applications, acrylic acid may graft polymerize onto a starch or other polysaccharide without the assistance of acrylamide. For example, acrylic acid may polymerize when placed under heat and/or pressure. Polymerization without the addition of acrylamide may be accomplished, for example, in a heated screw extruder, such as a single screw or a double screw.

As described above, the monomer is graft polymerized onto a polysaccharide in the presence of an initiator to form a starch graft copolymer. Exemplary starches and initiators have been described above. The starch graft copolymer may then be cross-linked, for example, by adding a chemical cross-linking agent to form a cross-linked starch graft copolymer. It may be desirable for the starch graft copolymer to be cross-linked if it dissolves in aqueous fluids previous to being cross-linked. Cross-linking is one method to permit the starch graft copolymer to absorb aqueous fluids without dissolving. However, the amount of cross-linking agent added is typically indirectly proportional to the absorbency of the resulting SAP product. Exemplary cross-linking agents have also been described above.

Alternative methods of cross-linking may also be employed. For example, a solid SAP product may be cross-linked through irradiation, such as through exposure to gamma or x-ray electromagnetic radiation, or to an electron beam and the like. Irradiation facilitates cross-linking of the starch graft copolymer by creating free radicals in the copolymer chain. In some applications, after irradiation an annealing or melting process may be used to re-form the cross-linked copolymer chains. Furthermore, it may be desirable to perform the irradiation process in an atmosphere relatively free of oxygen.

Although the addition of cross-linking agents may be desirable in the production of SAPs, self-cross-linking copolymers may also be used. In a self-cross-linking copolymer, either a single self-reactive functional group or multiple self-reactive functional groups or multiple co-reactive functional groups are incorporated into the mixture. One exemplary co-reactive functional group is a copolymer of acrylic acid and glycidyl methacrylate.

The pH of the cross-linked starch graft copolymer may be adjusted to a desired value for the particular agricultural application. For example, the cross-linked starch graft copolymer may be neutralized to convert the carboxyl groups to potassium salts. Alternative pH values may be desirable depending upon the type of soil and the type of crop the resulting SAPs will be applied to. The resulting pH for most agricultural applications typically will range from about 6.0 to about 8.0. The desired pH may be greater or less than this range depending on the requirements for the particular agricultural application.

Alternatively, in some embodiments, pH adjustment of the starch graft copolymer may occur prior to cross-linking. Exemplary solvents that may be used to effect pH adjustment include potassium hydroxide, potassium methoxide, or a mixture thereof, any of which may optionally be diluted in methanol or other solvents.

In alternative embodiments, pH adjustment may not be necessary. For instance, if potassium acrylate were used as the monomer in lieu of acrylic acid, the resulting product may already be within an acceptable pH range.

The resulting pH-adjusted, cross-linked starch graft copolymer may then be isolated. One exemplary method of isolation involves simply drying the cross-linked starch graft copolymer, such as, for example, on a heated drum or via air-drying. The dried SAP product may then be pelletized according to pelletization methods known to those having skill in the art. According to this embodiment, isolation of the SAP product may be achieved in an alcohol-free environment.

In another embodiment, the step of isolating the starch graft copolymer involves extruding the cross-linked starch graft copolymer such as through a heated screw to form granules of SAP product. To minimize re-agglomeration of the granules, the granules may be coated with a dusting agent that decreases their propensity to stick together. Exemplary dusting agents include cellulose, clay, starch, flour, and other natural or synthetic polymers that prevent the granules from sticking together. Alternatively, the granules may be lightly sprayed with methanol to prevent them from sticking together, and/or the extrusion can be performed under high pressure.

Yet another exemplary method of isolating the starch graft copolymer involves precipitating the pH-adjusted, cross-linked starch graft copolymer using water-miscible solvents such as alcohols, e.g., methanol, ethanol, propanol, and isopropanol. Immersing the cross-linked starch graft copolymer in alcohol may cause the alkali starch graft copolymer to precipitate into particles that are later screened to the desired size after drying. The alcohol removes the water and extraneous salts from the cross-linked starch graft copolymer.

Another exemplary implementation of this method of precipitation involves blending sufficient methanol into the pH-adjusted, cross-linked starch graft copolymer to achieve a smooth dispersion. The smooth dispersion may then be pumped into a precipitation tank, which may include a stirring system that can vigorously mix the methanol while pumping in the smooth cross-linked starch graft copolymer dispersion. Once mixed, the resulting methanol and cross-linked starch graft copolymer particles may be collected by decanting or washing with methanol or centrifuged and collected, then dried to a moisture level of between about 1 percent and about 20 percent.

Another implementation of the isolation step through precipitation with methanol involves wetting the surface of the cross-linked starch graft copolymer with a small amount of methanol and then chopping the cross-linked starch graft copolymer into larger "chunks" that will not re-adhere to one another. Once the surface of the starch graft copolymer has been wetted with methanol, the resulting material is slippery to the touch and is no longer sticky. This effect may be achieved by using a compositional ratio of between about one part and about two parts of methanol per one part of solid.

Once the methanol has been added, the cross-linked starch graft copolymer may be pumped through an in-line chopper to form chunks having a diameter of less than one inch or, alternatively, hand-chopped with scissors. In one embodiment, the resulting mixture is then fed into a tank or Waring blender that has between about 1.5 gallons and about 4.0 gallons of additional methanol per pound of cross-linked starch graft copolymer. In some embodiments, the cross-linked starch graft copolymer may be subject to a pulverizer, in the presence of methanol, such as an in-line mixer or disintegrator, which breaks the mass into smaller pieces as desired for the particular application. The methanol in the larger tank may be agitated with a Cowles dissolver or other mixer capable of achieving high speeds.

Yet another implementation of the isolation step through precipitation with methanol involves pre-forming the particle size before the methanol precipitation step. The use of dies to form strands or rods having different shapes and diameters can improve the particle size formation process. This particular implementation offers enhanced control of the final particle size. The cross-linked starch graft copolymer (neutralized or unneutralized) may be forced through a die plate having holes of varying diameter (e.g., about 1/16 inch to more than 1/4 inch) and varying shapes (e.g., round, star, ribbon, etc.).

Methods of forcing the cross-linked starch graft copolymer through the die plate include using a hand-operated plunger, screw-feeding, auguring, pumping, and any other commonly known method. The resulting strands or rods may be placed into the precipitation tank without any further addition of methanol as a premixing agent. The strands or rods may be treated to prevent them from sticking together by, for example, wetting or spraying the strands or rods with methanol or dusting them with a dusting agent, such as, for example, cellulose, clay, starch, flour, or other natural or synthetic polymers. The resulting strands or rods may be precipitated with agitated methanol, removed from the tank, and dried.

Alternatively, the cross-linked starch graft copolymer product may be mixed with a solvent, such as water, to form a slurry or gel.

Depending on the agricultural application, the final SAP product may have a particle size that is courser than about 300 mesh. For example, in some applications where the starch graft copolymer is applied directly into the soil with the crop, the particle size is courser than about 50 mesh, such as between about 8 to about 25 mesh. This particle size range correlates to commercially available granule applicators. Therefore, alternative particle sizes may be used.

Finer particle sizes may be used in seed coating or root dipping applications. By way of example, the particle size for seed coating may be between about 75 and about 300 mesh, such as about 100 mesh. For root coating, the particle size may be between about 30 mesh and about 100 mesh, such as about 50 mesh. Depending on the application, the SAP particles may be in powder form, however granular, flake, pelletized or rod-shaped SAP products may also be used. Any size or form of SAP particle may be used suitable for each particular application as would be apparent to those having skill in the art with the aid of the present disclosure.

FIG. 1 represents a root system 10 of a plant 12 being dipped into a SAP hydrogel 100, as shown from a perspective view. The SAP hydrogel 100 may be created from mixing a powdered SAP product, such as those heretofore described, with water or another liquid, such as liquid fertilizer. The hydrogel 100 may be mixed in a receptacle, such as a 5-gallon bucket 14. The SAP product may be added to the liquid, or conversely the liquid may be added to the SAP product. The composition may then be mixed. According to one exemplary embodiment, approximately 3/4 cup of SAP product (approximately 3 oz.) may be mixed with approximately 5 gallons of water.

Upon mixing, the resulting composition may be left to stand until the SAP product is hydrolyzed. The hydrolyzed mixture may then optionally be stirred until the resulting hydrogel 100 mixture is homogenous. The hydrogel 100 has a viscosity sufficient to cling to the plant root system 10 when the root system 10 is dipped into the hydrogel 100. The root system 10 may be partially submersed into the hydrogel 100, or may be completely immersed into the hydrogel 100.

The plant 12 may then be removed from the hydrogel 100 and the excess hydrogel clinging to the root system 10 is allowed to drain off. The plant 12 having a SAP-coated root system 10 may then be planted in soil, transported to a remote location and subsequently planted in soil, or stored for a period of time and then subsequently planted.

In an alternative setting, the SAP hydrogel 100 disclosed may be used in conjunction with plant cuttings. A plant cutting may be obtained and an opening may be created within the cutting. The cutting may then be dipped into the SAP hydrogel 100 such that the hydrogel is allowed to be disposed within the opening created in the cutting. The cutting may then be stored, transported, or planted as desirable.

According to some embodiments additional agricultural additives may be added to the SAP hydrogel 100 at some point during preparation of the hydrogel 100. The agricultural additives may be added at various stages during preparation of the hydrogel 100, and may be added in solid form, or in liquid form as would be apparent to those having skill in the art with the aid of the present disclosure. Exemplary additives that may be introduced into the SAP hydrogel 100 mixture may include fertilizer. Various fertilizers that are commercially available may be included as would be apparent to those having skill in the art. In some embodiments, controlled-release fertilizers may be used.

Alternative or additional additives that may also be included within the SAP hydrogel 100 may include pesticides, herbicides, fungicides, growth hormones and regulators, mycorrhizal fungi, kelp products, soil-based nutrients and the like.

Exemplary pesticides that may be included in the SAP hydrogel 100 include, but are not limited to, acaricides, algicides, antifeedants, avicides, bactericides, bird repellents, chemosterilants, herbicide safeners, insect attractants, insect repellents, insecticides, mammal repellents, mating disruptors, molluscicides, nematicides, plant activators, plant-growth regulators, rodenticides, synergists, and virucides. Exemplary microbial pesticides include *bacillus thuringiensis* and mycorrhizal fungi. Exemplary insecticides include, but are not limited to, thiodan, diazinon, and malathion.

Exemplary commercially available pesticides include, but are not limited to: Admire™ (imidacloprid) manufactured by Bayer, Regent™ (fipronil) manufactured by BASF, Dursban™ (chlorpyrifos) manufactured by Dow, Cruiser™ (thiamethoxam) manufactured by Syngenta, Karate™ (lambda-cyhalothrin) manufactured by Syngenta, and Decis™ (deltamethrin) manufactured by Bayer. A combination or blend of pesticides may also be used. Alternative pesticides may also be used as would be apparent to those having skill in the art.

Fungicides may also be included in the SAP hydrogel 100. Fungicides may help control or prevent the growth of mold or fungus on the roots, seeds or seedlings thus inhibiting root or seed rot. Exemplary commercially available fungicides include, but are not limited to, Amistar™ (azoxystrobin) manufactured by Syngenta, Folicur™ (tebuconazole) manufactured by Bayer, Opus™ (epoxiconazole) manufactured by BASF, Dithane™ (mancozeb) manufactured by Dow, Flint™ (trifloxystrobin) manufactured by Bayer, and Ridomil™ (metalaxyl) manufactured by Syngenta. A combination or blend of fungicides may also be used. Alternative fungicides may also be used as would be apparent to those having skill in the art with the aid of the present disclosure.

Exemplary commercially available herbicides that may be included within the SAP hydrogel 100 include, but are not limited to, Roundup™ (glyphosate) manufactured by Monsanto, Gramoxone™ (paraquat) manufactured by Syngenta, Harness™ (acetochlor) manufactured by Monsanto, Prowl™ (pendimethalin) manufactured by BASF, Dual™ (metolachlor) manufactured by Syngenta, and Puma™ (fenoxaprop) manufactured by Bayer. Furthermore, a combination or blend of herbicides may be used. Alternative herbicides may also be used as would be apparent to those having skill in the art with the aid of the present disclosure.

Exemplary commercially available plant-growth regulators that may be optionally included in the SAP hydrogel 100 include, but are not limited to: Ethrel™ (ethephon) manufactured by Bayer, PiX™ (mepiquat) manufactured by BASF, Dropp™ (thidiazuron) manufactured by Bayer, Finish™ (cyclanilide) manufactured by Bayer, and Royal MH™ (maleic hydrazide) manufactured by Crompton. A combination or blend of growth regulators may be used. Furthermore, growth inhibitors, growth retardants, growth stimulants, and derivatives and mixtures thereof may be included. Alternative growth regulators or hormones may also be used as would be apparent to those having skill in the art with the aid of the present disclosure.

Exemplary soil-based nutrients that may be optionally included in the SAP hydrogel 100 include calcium, magnesium, potassium, phosphorus, boron, zinc, manganese, copper, iron, sulfur, nitrogen, molybdenum, silicon, ammonium phosphate, fish meal, organic compounds and additives, organic based fertilizers derived from plant and animal products, and derivatives, blends, and mixtures thereof. More information about exemplary growth-promoting additives can be found in *The Farm Chemicals Handbook* published by Meister Publishing Company.

Because the matrix of the SAP hydrogel 100 may be selected to maximize product performance in various settings, compositional parameters, such as solids concentration, concentration of starch, concentration of additives, types of additives, numbers of additives, addition processes, and addition timing, may vary greatly. Therefore, the following examples are intended to further illustrate exemplary embodiments, and are not intended to limit the scope of the disclosure.

The following Examples demonstrate exemplary procedures used to prepare a SAP hydrogel using the method(s) described herein:

EXAMPLE 1

3 oz. of powdered SAP product (90% starch-g-poly (2-propenamide-co-2-propenoic acid) potassium salt) was slowly sprinkled as a thin film at intervals on the surface of five gallons of water. The SAP product was mixed between intervals using an electric drill equipped with a paint mixer apparatus. The drill speed was initially set on low speed to avoid water splashing out of the receptacle. The drill speed was increased as the mixture became more viscous.

When clumps in the mixture developed, the mixture was allowed to stand for 30 minutes until the SAP product was fully hydrolyzed. The hydrolyzed mixture was stirred thoroughly for 10 minutes to form homogenous mixture. The SAP hydrogel was allowed to stand for 15 minutes, and subsequently stirred again.

EXAMPLE 2

3 oz. of powered SAP product (90% starch-g-poly (2-propenamide-co-2-propenoic acid) potassium salt) was slowly sprinkled onto the surface of five gallons of water while rapidly stirring with a paint stick. The mixture was allowed to stand until clumps of SAP product hydrolyzed, while occasionally stirring and pressing larger clumps of SAP product against the side of the container. Once the SAP product was fully hydrolyzed, the mixture was stirred to form a homogenous mixture.

The methods disclosed for delivering a SAP to a plant and the SAP compositions disclosed herein may reduce desiccation of roots during transportation and storage and may further reduce stress and shock of the plant during planting. Once the root system is placed within the ground, the SAP products disclosed provide enhanced moisture around bare roots in comparison to conventional methods. This enhanced moisture content may encourage establishment, particularly seedling establishment.

The SAP products for use with the methods disclosed may be made available in hydrogel form, or alternatively, as a powdered, granulized, pelletized, or flake SAP product that may be ready for hydrolyzation once added to water or other liquid.

While specific embodiments and applications have been illustrated and described, it is to be understood that the present disclosure is not limited to the precise configuration and components disclosed herein. Various modifications, changes, and variations which will be apparent to those skilled in the art may be made in the arrangement, operation, and details of the components, compositions and methods disclosed herein without departing from the spirit and scope of the following claims.

What is claimed is:

1. A method of delivering a superabsorbent polymer to a plant, comprising:
    obtaining a superabsorbent polymer hydrogel, wherein the superabsorbent polymer is starch-g-poly (2-propenamide-co-2-propenoic acid) potassium salt starch graft copolymer;
    obtaining a plant having a root structure;
    dipping at least a portion of the root structure of the plant into the superabsorbent polymer hydrogel; and
    removing the root structure from the superabsorbent polymer hydrogel.

2. The method of claim 1, further comprising:
    allowing excess superabsorbent polymer hydrogel to drain off of the portion of the root structure after removal from the hydrogel.

3. The method of claim 1, wherein dipping a portion of the root structure comprises immersing the entire root structure of the plant into the superabsorbent polymer hydrogel.

4. The method of claim 1, further comprising:
    transporting the plant to a remote location for subsequent planting after removing the root structure from the hydrogel.

5. The method of claim 1, further comprising:
    storing the plant for a period of time for subsequent planting after removing the root structure from the hydrogel.

6. The method of claim 1, further comprising:
    planting the root structure into soil after removal from the superabsorbent polymer hydrogel.

7. The method of claim 1, wherein obtaining a superabsorbent polymer hydrogel comprises:
    Obtaining powered starch-g-poly (2-propenamide-co-2-propenoic acid) potassium salt starch graft copolymer;
    adding the powdered starch-g-poly (2-propenamide-co-2-propenoic acid) potassium salt starch graft copolymer to a liquid; and
    mixing the liquid and the powdered starch-g-poly (2-propenamide-co-2-propenoic acid) potassium salt starch graft copolymer to form the superabsorbent polymer hydrogel.

8. The method of claim 7, wherein obtaining a superabsorbent polymer hydrogel further comprises:
    allowing the mixed liquid and powdered starch-g-poly (2-propenamide-co-2-propenoic acid) potassium salt starch graft copolymer to stand until hydrolyzed; and
    stirring the hydrolyzed mixture until the superabsorbent polymer hydrogel is homogenous.

9. A method of delivering a superabsorbent polymer to a plant or plant cutting, comprising:
    dipping a portion of the plant or plant cutting into a starch-graft superabsorbent polymer hydrogel, wherein the superabsorbent polymer is starch-g-poly (2-propenamide-co-2-propenoic acid) potassium salt starch graft copolymer;
    removing the plant or plant cutting from the superabsorbent polymer hydrogel; and
    planting the plant or plant cutting into soil after removal from the superabsorbent polymer hydrogel.

10. The method of claim 9, wherein dipping a portion of the plant comprises immersing a root structure of the plant into the starch-graft superabsorbent hydrogel.

11. The method of claim 9, further comprising:
    creating an opening in the plant cutting; and
    dipping the plant cutting into the starch-graft superabsorbent hydrogel such that hydrogel is disposed within the opening created.

12. The method of claim 9, further comprising:
    transporting the plant or plant cuffing to a remote location for subsequent planting after removing the plant or plant cutting from the hydrogel.

13. The method of claim 9, further comprising:
    storing the plant or plant cutting for a period of time for subsequent planting after removing the plant or plant cuffing from the hydrogel.

14. The method of claim 9, further comprising:
    obtaining starch-g-poly(2-propenamide-co-2-propenoic acid) potassium salt starch graft copolymer in powdered form;
    adding the powdered starch-g-poly(2-propenamide-co-2-propenoic acid) potassium salt starch graft copolymer to water; and
    mixing the water and the powdered starch-g-poly (2-propenamide-co-2-propenoic acid) potassium salt starch graft copolymer to form the superabsorbent polymer hydrogel.

15. The method of claim 14, wherein adding the powdered starch-g-poly (2-propenamide-co-2-propenoic acid) potassium salt starch graft copolymer to water comprises adding a ratio of starch-g-poly (2-propenamide-co-2-propenoic acid) potassium salt starch graft copolymer to water of about ¾ cup of powdered starch-g-poly (2-propenamide-co-2-propenoic acid) potassium salt starch graft copolymer to about every five gallons of water.

16. A root dip composition, comprising:
    starch-g-poly (2-propenamide-co-2-propenoic acid) potassium salt starch graft copolymer; and
    an effective amount of water mixed with the starch-g-poly (2-propenamide-co-2-propenoic acid) potassium salt starch graft copolymer to form a hydrogel having a viscosity sufficient to coat a plant root dipped therein.
    pg,23

17. The root dip composition of claim 16, wherein a ratio of starch-g-poly (2-propenamide-co-2-propenoic acid) potassium salt starch graft copolymer to water is about ¾ cup of starch-g-poly (2-propenamide-co-2-propenoic acid) potassium salt starch graft copolymer to every about 5 gallons of water.

18. The root dip composition of claim 16, further comprising an agricultural additive, wherein the agricultural additive is at least one of the following: fertilizer, pesticide, herbicide, fungicide, and growth regulators.

* * * * *

UNITED STATES PATENT AND TRADEMARK OFFICE
CERTIFICATE OF CORRECTION

PATENT NO. : 7,607,259 B2  Page 1 of 1
APPLICATION NO. : 11/333130
DATED : October 27, 2009
INVENTOR(S) : Milan H. Savich It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 912 days.

Signed and Sealed this

Twelfth Day of October, 2010

David J. Kappos
*Director of the United States Patent and Trademark Office*